United States Patent
Roy et al.

(10) Patent No.: US 11,480,145 B1
(45) Date of Patent: Oct. 25, 2022

(54) METHODS AND SYSTEM TO INCREASE AVAILABLE PROPULSIVE MOTOR TORQUE DURING AN ENGINE START

(71) Applicant: Ford Global Technologies, LLC, Dearborn, MI (US)

(72) Inventors: Judhajit Roy, Royal Oak, MI (US); Jason Meyer, Canton, MI (US); Maruthi Ravichandran, Dearborn, MI (US); Fazal Syed, Canton, MI (US); Sassan Farahmand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/449,227

(22) Filed: Sep. 28, 2021

(51) Int. Cl.
*F02N 11/08* (2006.01)
*F02N 11/04* (2006.01)

(52) U.S. Cl.
CPC .......... *F02N 11/0859* (2013.01); *F02N 11/04* (2013.01); *F02N 11/0851* (2013.01); *F02N 2200/042* (2013.01); *F02N 2200/046* (2013.01); *F02N 2200/08* (2013.01); *F02N 2200/0802* (2013.01); *F02N 2200/10* (2013.01); *F02N 2200/101* (2013.01); *F02N 2300/104* (2013.01); *F02N 2300/2006* (2013.01)

(58) Field of Classification Search
None
See application file for complete search history.

(56) References Cited

U.S. PATENT DOCUMENTS

| | | | | |
|---|---|---|---|---|
| 8,326,475 | B2* | 12/2012 | Yoshida | F02N 7/12 |
| | | | | 701/54 |
| 9,068,546 | B2* | 6/2015 | Gibson | B60K 6/30 |
| 9,108,614 | B2* | 8/2015 | Doering | F16H 61/02 |
| 9,322,380 | B2* | 4/2016 | Doering | B60K 6/24 |
| 9,499,165 | B2* | 11/2016 | Doering | B60W 10/10 |
| 9,550,488 | B1* | 1/2017 | Johri | B60K 6/48 |
| 9,637,109 | B1 | 5/2017 | Johri et al. | |
| 9,758,149 | B2* | 9/2017 | Doering | B60W 30/19 |
| 9,758,160 | B2* | 9/2017 | Gibson | B60W 10/02 |
| 10,071,653 | B2* | 9/2018 | Meyer | B60W 20/00 |
| 10,131,342 | B2* | 11/2018 | Meyer | B60W 20/10 |
| 10,471,951 | B2* | 11/2019 | Johri | B60W 10/11 |
| 10,479,349 | B2* | 11/2019 | Johri | B60W 20/19 |
| 10,640,102 | B2* | 5/2020 | Johri | B60W 10/023 |
| 10,703,215 | B2* | 7/2020 | Liang | B60L 7/26 |
| 10,703,354 | B2* | 7/2020 | Zhang | B60W 10/026 |
| 11,097,716 | B2* | 8/2021 | Robison | B60W 10/026 |

(Continued)

FOREIGN PATENT DOCUMENTS

| | | | | |
|---|---|---|---|---|
| CN | 107415923 A | * | 12/2017 | B60K 6/387 |
| CN | 107415928 A | * | 12/2017 | B60K 6/38 |

(Continued)

*Primary Examiner* — Kevin R Steckbauer
(74) *Attorney, Agent, or Firm* — David Kelley; McCoy Russell LLP

(57) ABSTRACT

Systems and methods for starting an engine that may be started via an electric machine and a driveline disconnect clutch are described. In one example, the method estimates a maximum motor propulsive torque during engine starting. The maximum motor propulsive torque may be based on an estimated speed that a torque converter impeller speed will be when an engine cranking period ends.

15 Claims, 8 Drawing Sheets

(56) References Cited

U.S. PATENT DOCUMENTS

| | | | |
|---|---|---|---|
| 2010/0250037 A1* | 9/2010 | Yoshida | B60W 10/06 903/946 |
| 2013/0291830 A1* | 11/2013 | Doering | B60W 10/10 123/350 |
| 2013/0296123 A1* | 11/2013 | Doering | B60W 20/40 477/174 |
| 2013/0296126 A1* | 11/2013 | Gibson | B60L 50/16 903/902 |
| 2013/0297162 A1* | 11/2013 | Dai | B60W 10/115 701/55 |
| 2015/0266469 A1* | 9/2015 | Gibson | F02D 41/062 180/65.265 |
| 2016/0107633 A1* | 4/2016 | Liang | B60W 10/06 903/902 |
| 2016/0214599 A1* | 7/2016 | Doering | B60W 20/40 |
| 2016/0236677 A1* | 8/2016 | Doering | B60W 20/40 |
| 2017/0120896 A1* | 5/2017 | Thompson | B60K 6/48 |
| 2018/0009433 A1* | 1/2018 | Johri | B60W 10/06 |
| 2018/0050609 A1* | 2/2018 | Meyer | B60L 50/61 |
| 2018/0162347 A1* | 6/2018 | Meyer | B60K 6/547 |
| 2019/0047549 A1* | 2/2019 | Johri | B60K 6/38 |
| 2019/0351891 A1* | 11/2019 | Zhang | B60W 30/143 |
| 2020/0079350 A1* | 3/2020 | Morrison | B60W 20/40 |
| 2021/0122354 A1* | 4/2021 | Robison | B60W 20/11 |
| 2021/0171006 A1* | 6/2021 | Syed | B60W 10/026 |
| 2021/0291807 A1* | 9/2021 | Hayasaka | B60K 6/48 |

FOREIGN PATENT DOCUMENTS

| | | | | |
|---|---|---|---|---|
| CN | 103381809 B | * | 12/2018 | B60K 6/26 |
| DE | 112010000430 T5 | * | 8/2012 | B60K 6/365 |
| DE | 102013104516 A1 | * | 11/2013 | B60K 6/24 |
| DE | 102013208401 A1 | * | 11/2013 | B60W 10/06 |
| DE | 102015117563 A1 | * | 4/2016 | B60L 15/20 |
| DE | 102016117124 A1 | * | 3/2017 | B60K 6/38 |
| DE | 102016120791 A1 | * | 5/2017 | B60K 6/387 |
| DE | 102017109462 A1 | * | 11/2017 | B60K 6/387 |
| DE | 102017109577 A1 | * | 11/2017 | B60K 6/38 |
| DE | 102017118731 A1 | * | 2/2018 | B60L 11/123 |
| DE | 102017118732 A1 | * | 2/2018 | B60K 6/48 |
| DE | 102017118842 A1 | * | 2/2018 | B60L 15/2054 |
| DE | 102017129499 A1 | * | 6/2018 | B60L 11/12 |
| DE | 102018127834 A1 | * | 5/2019 | B60K 6/26 |
| DE | 102020128025 A1 | * | 4/2021 | B60K 6/26 |
| JP | 3585798 B2 | * | 11/2004 | B60K 17/354 |
| JP | 3840829 B2 | * | 11/2006 | B60K 6/365 |
| JP | 3861321 B2 | * | 12/2006 | B60K 17/356 |
| JP | 3917675 B2 | * | 5/2007 | B60W 10/04 |
| JP | 5896735 B2 | * | 3/2016 | |
| RU | 2013120305 A | * | 11/2014 | B60K 6/24 |
| WO | WO-2018185224 A1 | * | 10/2018 | B60W 30/18018 |

\* cited by examiner

METHODS AND SYSTEM TO INCREASE AVAILABLE PROPULSIVE MOTOR TORQUE DURING AN ENGINE START

FIELD

The present description relates to methods and a system for starting an engine via closing a driveline disconnect clutch.

BACKGROUND AND SUMMARY

A hybrid vehicle may include a clutch that is placed in a driveline between an engine and an electric machine. The clutch may be selectively opened and closed according to vehicle operating conditions. The engine may solely provide propulsive torque to the driveline when the clutch is closed, or alternatively, the engine and the electric machine may provide propulsive torque to the driveline when the clutch is closed. The electric machine may be the sole propulsive torque source when the clutch is open. If the clutch is open and operation of the engine is requested, the clutch may be closed to rotate the engine for engine starting. However, if there is insufficient torque capacity to start the engine without causing a reduction in driveline speed, vehicle performance may not meet expectations. Therefore, it may be desirable to provide a way of estimating a maximum electric machine torque so that there may be sufficient torque may be reserved for engine starting and vehicle propulsion.

The inventors herein have recognized the above-mentioned issues and have developed a method for starting an engine, comprising: cranking the engine via an electric machine and limiting propulsive torque generated by the electric machine via a controller according to a predicted torque converter impeller speed.

By estimating a maximum motor propulsive torque according to a predicted torque converter impeller speed at an end of an engine cranking period, it may be possible to provide the technical result of an improved maximum motor propulsive torque determination so that a possibility of driveline torque disturbances during engine cranking may be reduced. In particular, a requested shaped, or slew rate limited, driver demand torque may be limited to the maximum motor propulsive torque during an engine start so that torque that is provided to a driveline via an electric machine may monotonically increase during engine cranking, where the engine is cranked via the electric machine.

The present description may provide several advantages. In particular, the approach may improve engine starting. Further, the approach may reduce a possibility of a driveline torque hole, or decreasing driveline torque, during engine starting. Further still, the approach may improve engine starting when the engine is started via closing a driveline disconnect clutch when a torque converter clutch is unlocked.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 3:
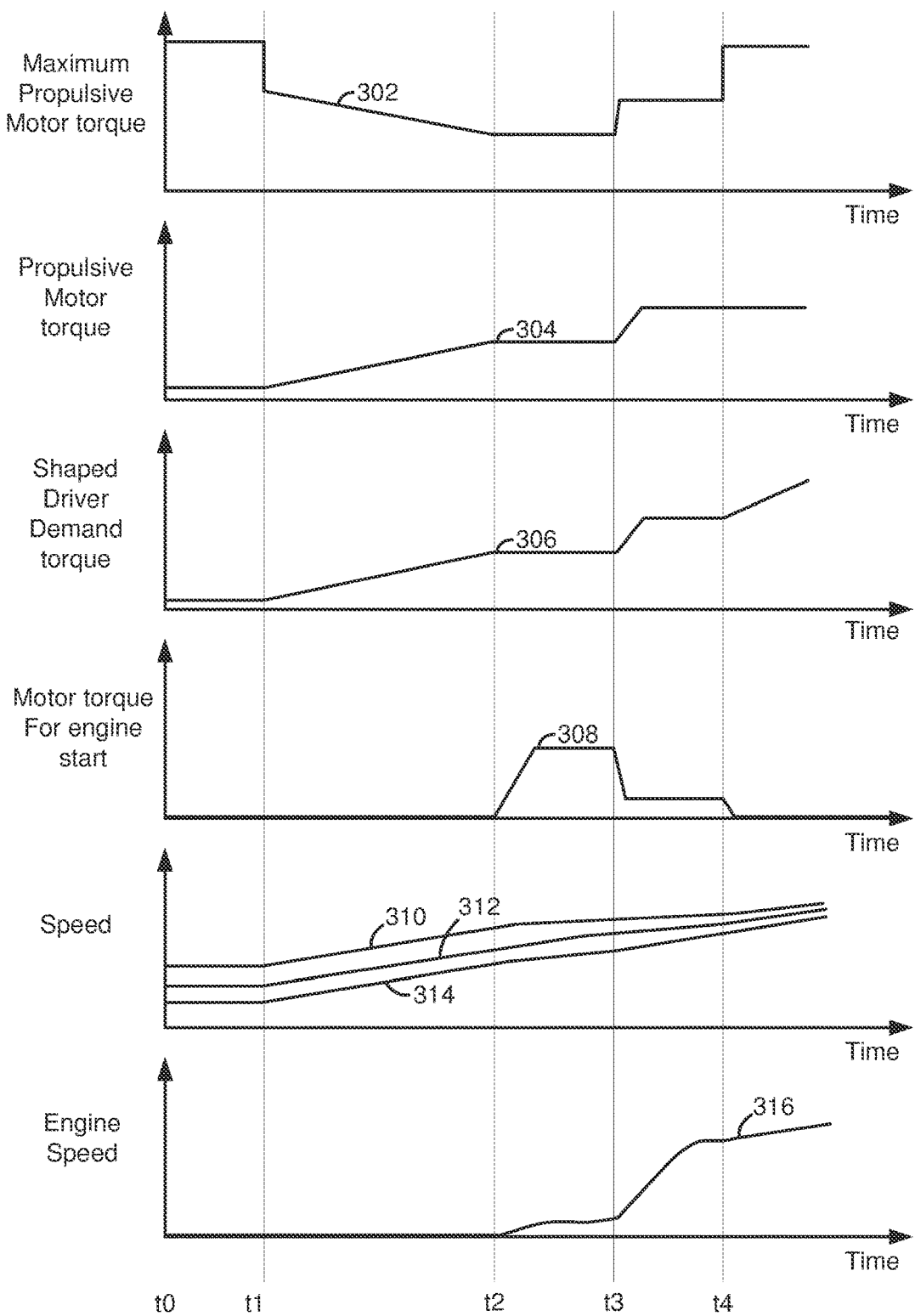
FIG. 3 shows example prior art engine starting sequence.
Figure 4:
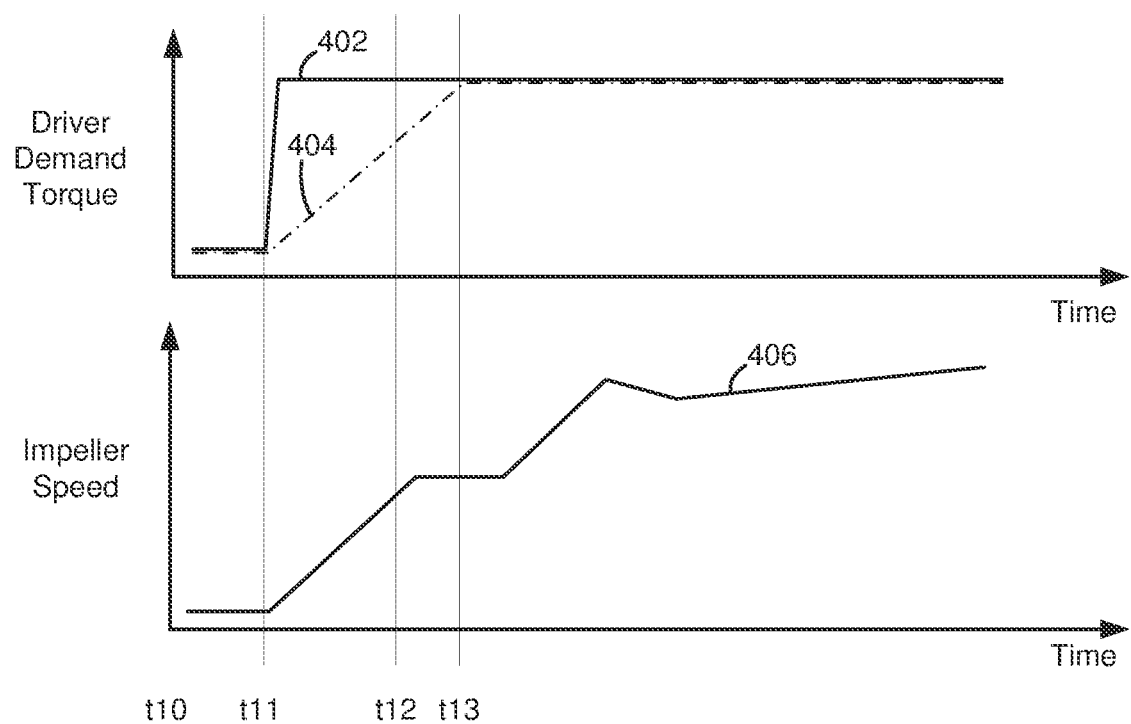
FIG. 4 shows physical conditions that are a basis for estimating a torque converter stall speed according to the present method.
Figure 5:
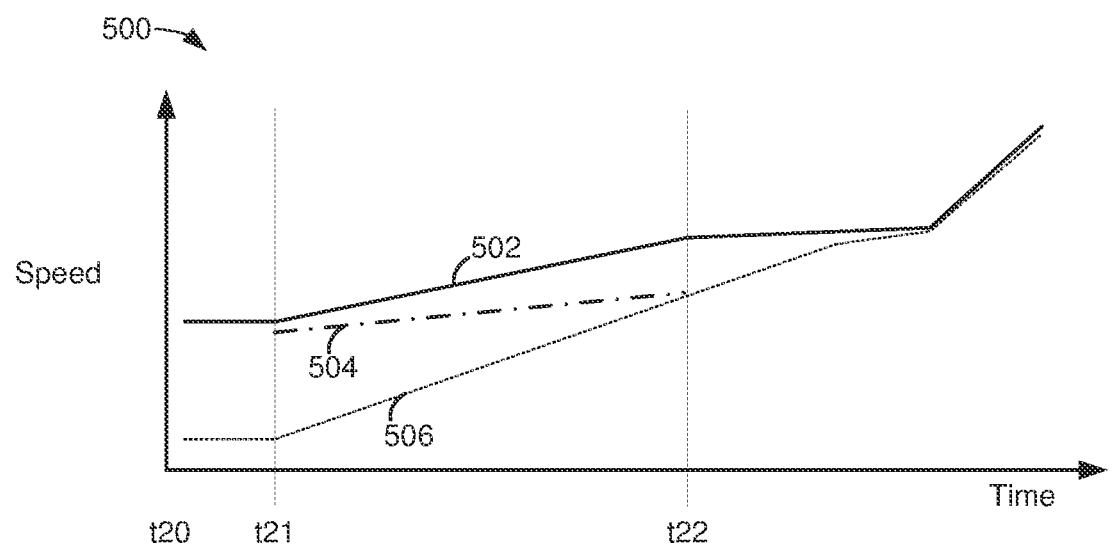
FIGS. 5 and 6 show an example torque converter impeller speed estimate and an estimated disconnect clutch torque capacity according to the present method.
Figure 6:
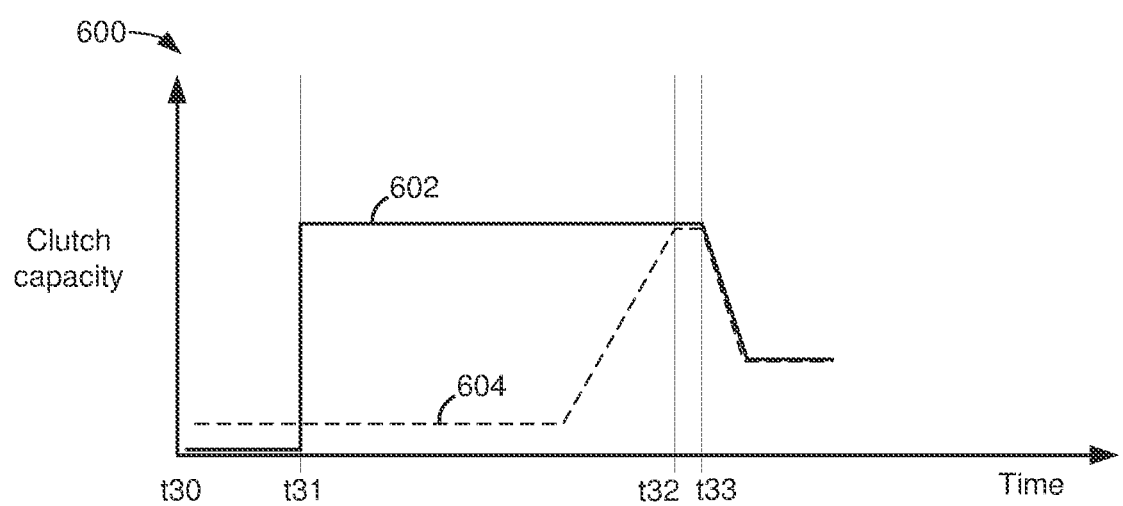
Figure 7:
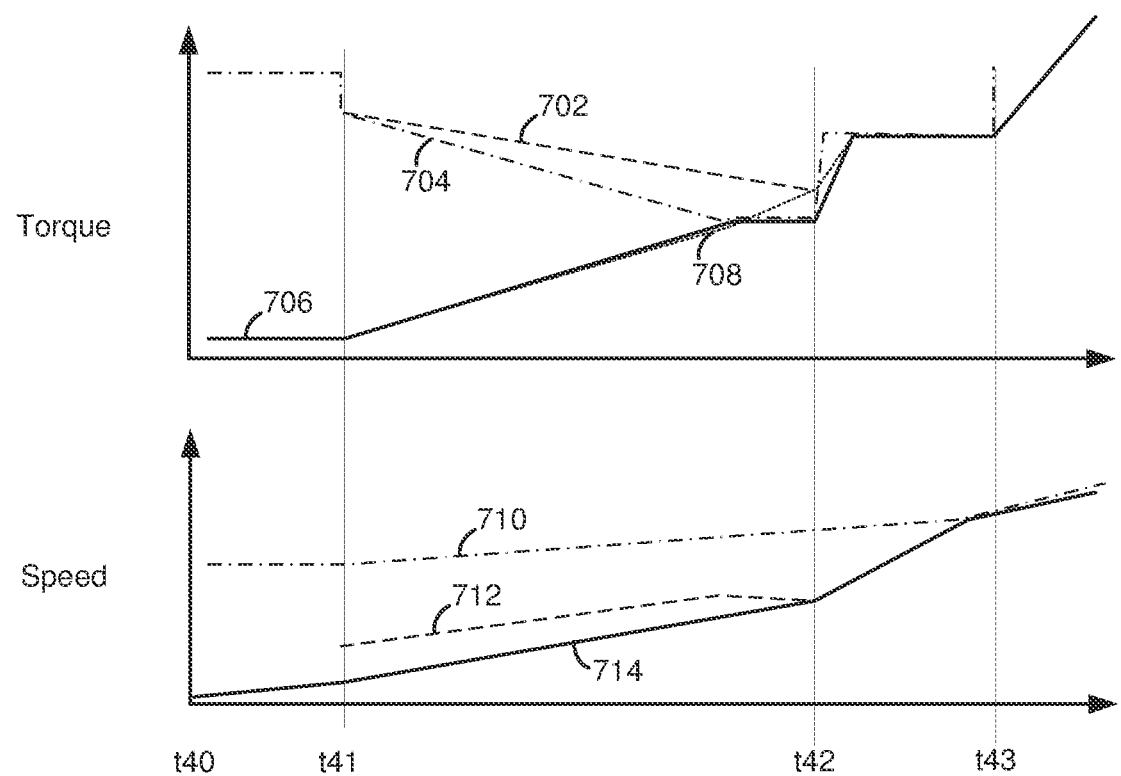
FIGS. 7 and 8 show two examples of maximum propulsive motor torque and predicted torque converter stall speed according to the methods described herein.
Figure 8:
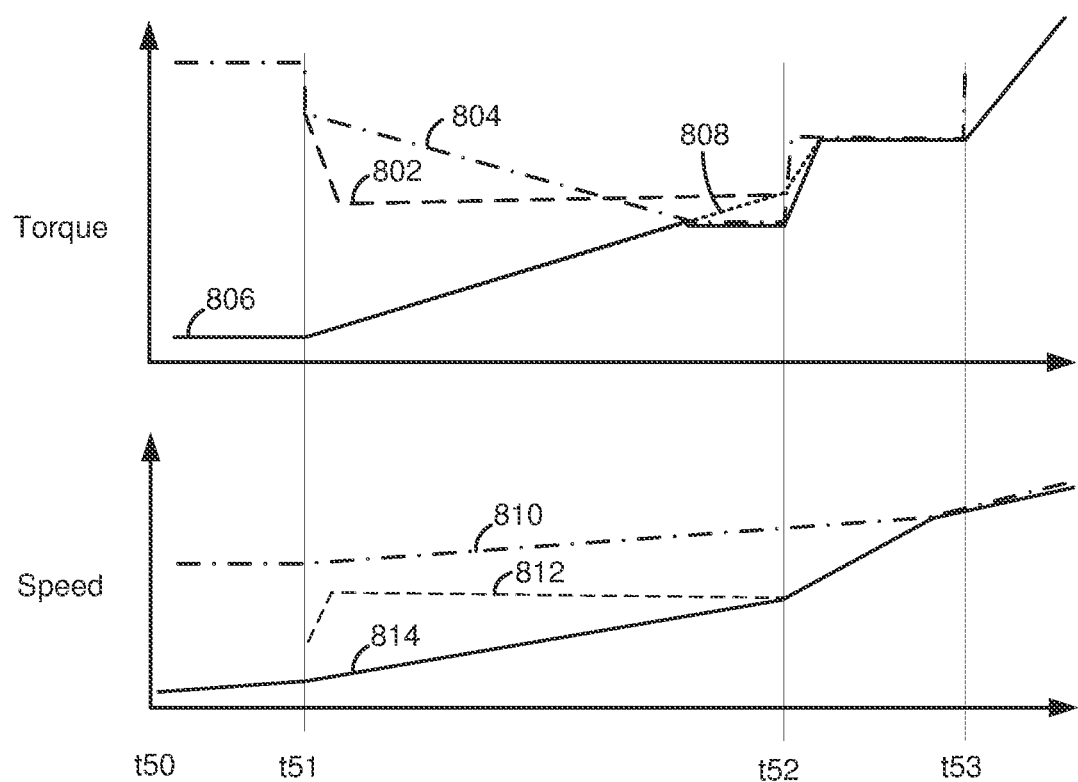
Figure 9:
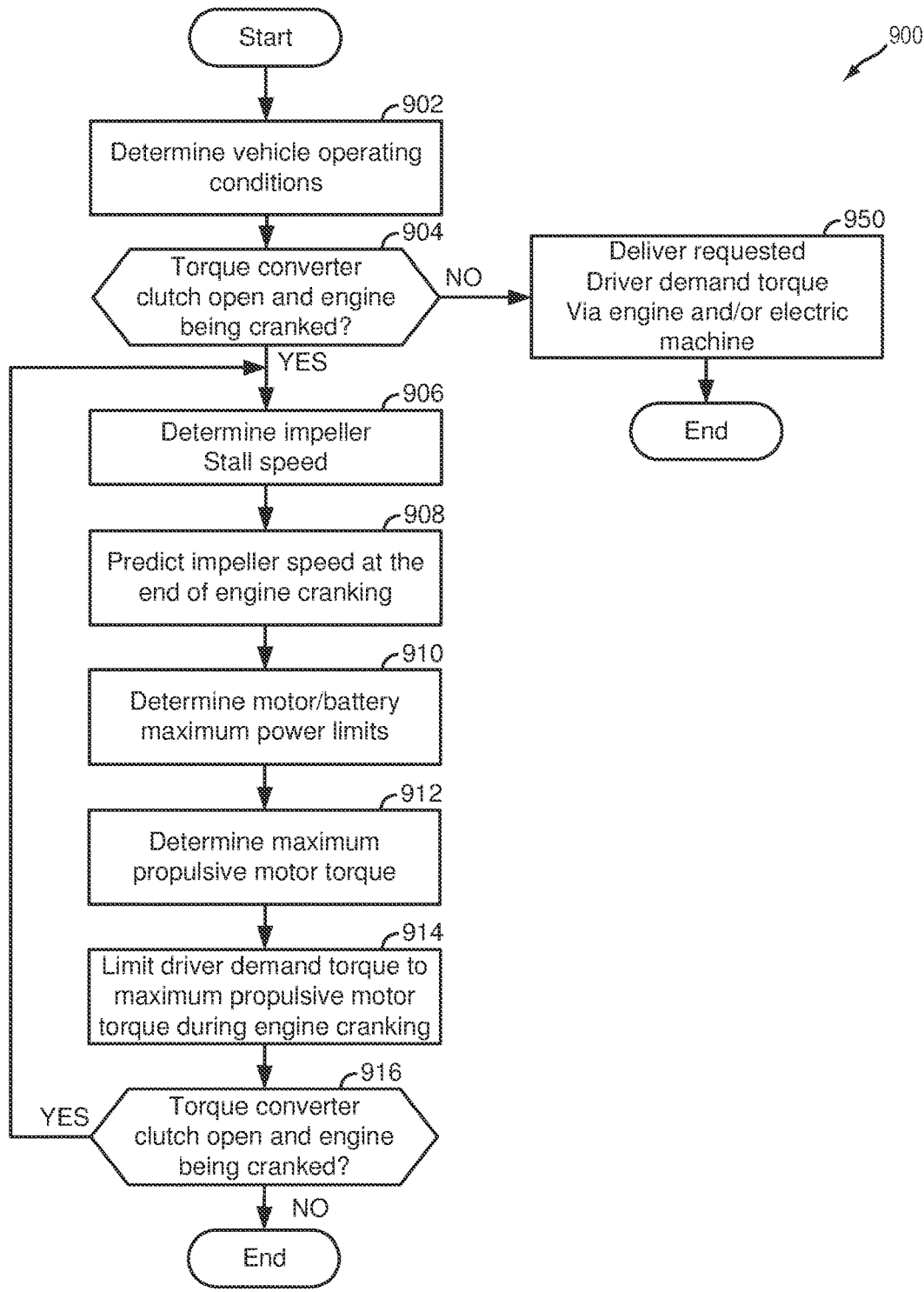
FIG. 9 shows an example method for determining a maximum propulsive effort that may be provided via an electric machine or motor.

The present description is related to starting an engine. The engine may be started by closing a driveline disconnect clutch and delivering torque from an electric machine to the engine through the driveline disconnect clutch. The electric machine may also be providing propulsive effort to propel the vehicle when the engine is started by closing the driveline disconnect clutch. In order to achieve an acceptable engine start and acceptable vehicle propulsion, driver demand torque may be limited to a maximum propulsive motor torque. The maximum propulsive motor torque may be based on a predicted torque converter impeller speed at an end of an engine cranking period. The engine that is being started may be of the type shown in FIG. 1. The engine may be included in a driveline of a vehicle of the type shown in FIG. 2. A prior art engine starting sequence is shown in FIG. 3. Vehicle operating conditions that are a basis for estimating torque converter stall speed are shown in FIG. 4. Torque converter impeller speed and disconnect clutch torque capacity values may be estimated according to the present method as shown in FIGS. 5 and 6. Estimates of maximum propulsive motor torque and predicted torque converter stall speed are shown in FIGS. 7 and 8. An example method for determining a maximum propulsive effort is shown in FIG. 9.

Figure 1:
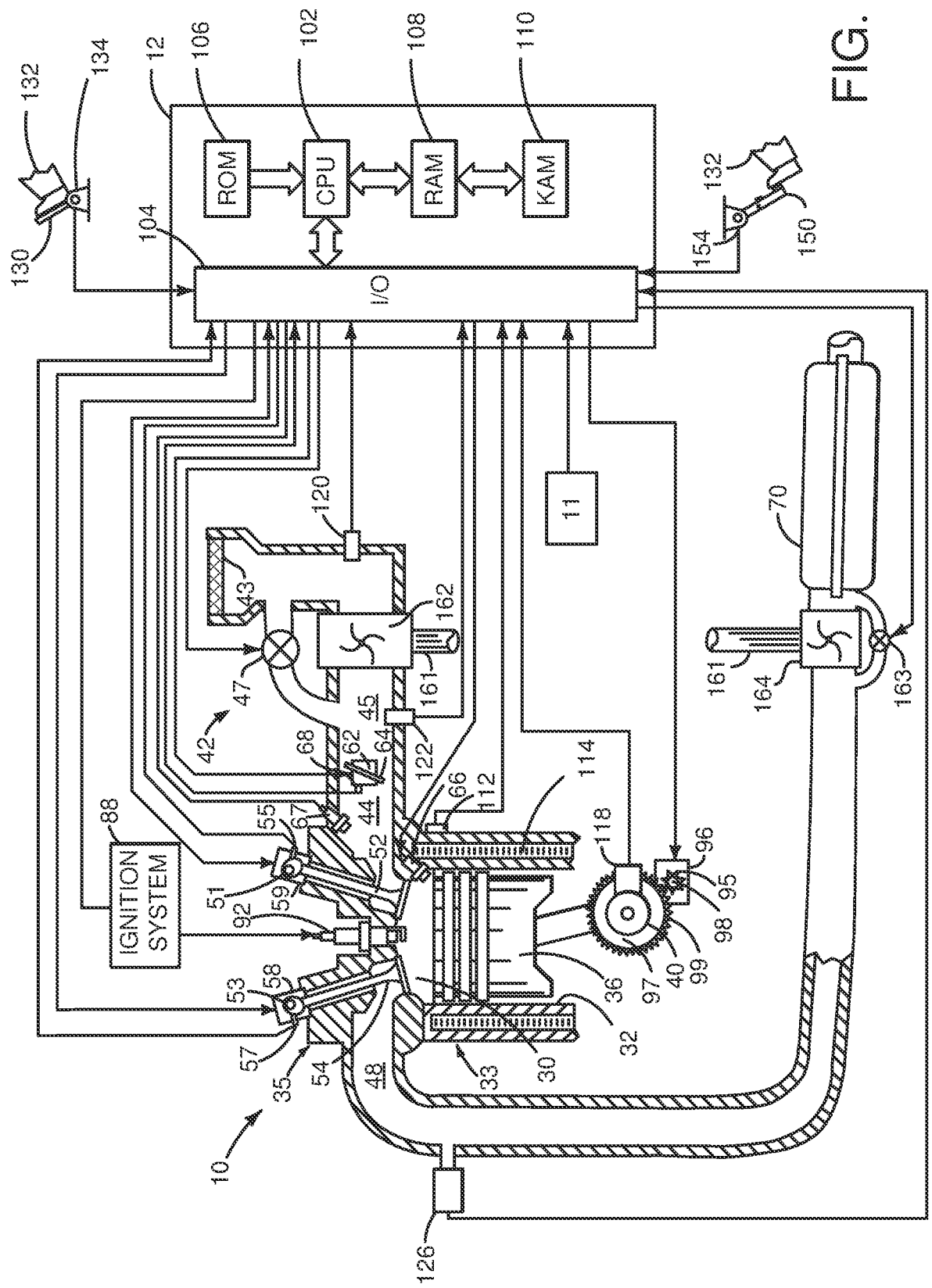
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
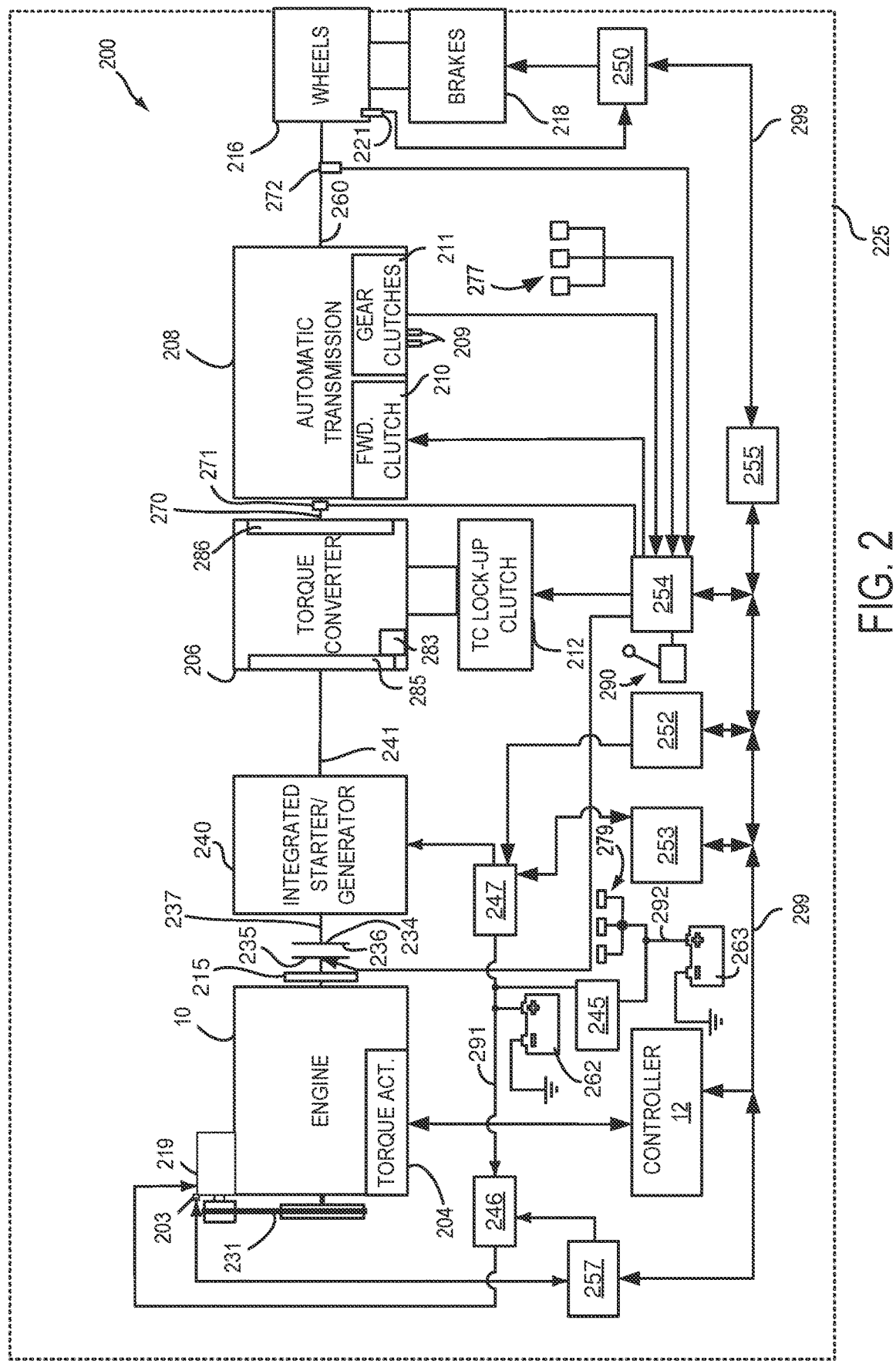
FIG. 2 is a schematic diagram of a vehicle driveline.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system comprising: an engine; an electric machine coupled to a torque converter; a driveline disconnect clutch positioned in a driveline between the engine and the electric machine; and a controller including executable instructions stored in non-transitory memory that cause the controller to estimate a maximum motor propulsive torque for the electric machine, the maximum motor mechanical power (e.g., a maximum amount of mechanical power that may be produced by the electric machine), a predicted torque converter impeller speed, and a motor torque reserved for starting the engine.

The system further comprises a torque converter and a transmission, the torque converter positioned in the driveline between the transmission and the driveline disconnect clutch. The system further comprises additional instructions to crank the engine via the electric machine. The system further comprises additional instructions to at least partially close the driveline disconnect clutch to crank the engine. The system further comprises additional instructions determine the predicted torque converter impeller speed based on a torque converter impeller speed and a torque converter stall speed. The system includes where the torque converter stall speed is based on a shaped driver demand torque. The system includes where the torque converter stall speed is based further on a torque converter turbine speed. The system includes where the torque converter stall speed is further based on an unshaped driver demand torque.

Referring now to FIG. 3, an example prior art engine starting sequence is shown. The plots are aligned in time and occur at a same time. The vertical lines at t0-t3 indicate times of particular interest.

The first plot from the top of FIG. 3 is a plot of maximum propulsive motor torque versus time. The vertical axis represents the maximum propulsive motor torque (e.g., a maximum amount of propulsive torque that may be provided via an electric machine (240) to the driveline to propel the vehicle) and the maximum propulsive motor torque amount increases in the direction of the vertical axis arrow. The horizontal axis represents time and the time increases from the left side of the figure to the right side of the figure. Trace 302 represents the maximum propulsive motor torque.

The second plot from the top of FIG. 3 is a plot of an amount of propulsive motor torque that is provided to the driveline versus time. The vertical axis represents the amount of propulsive motor torque that is provided to the driveline and the amount of propulsive motor torque increases in the direction of the vertical axis arrow. The horizontal axis represents time and the time increases from the left side of the figure to the right side of the figure. Trace 304 represents the amount of propulsive motor torque that is provided to the driveline via an electric machine (e.g., 240).

The third plot from the top of FIG. 3 is a plot of shaped driver demand torque versus time. The vertical axis represents shaped driver demand torque and the shaped driver demand torque increases in the direction of the vertical axis arrow. The horizontal axis represents time and the time increases from the left side of the figure to the right side of the figure. Trace 306 represents the shaped driver demand torque. The shaped driver demand torque is a slew rate limited version of driver demand torque. In other words, the shaped driver demand torque follows driver demand torque if driver demand torque does not increase by more than a specified amount. The shaped driver demand torque increases at a predetermined rate if the driver demand torque increases by more than the specified amount, or if the driver demand torque is greater than the shaped driver demand torque. The shaped driver demand torque follows the driver demand torque when the driver demand torque is decreasing and equal to or less than the shaped driver demand torque.

The fourth plot from the top of FIG. 3 is a plot of electric machine or motor torque applied to start the engine versus time. The vertical axis represents the motor torque applied to start the engine and the motor torque applied to start the engine increases in the direction of the vertical axis arrow. The horizontal axis represents time and the time increases from the left side of the figure to the right side of the figure. Trace 308 represents the motor torque applied to start the engine.

The fifth plot from the top of FIG. 3 is a plot of torque converter speeds versus time. The vertical axis represents speed and speed increases in the direction of the vertical axis arrow. The horizontal axis represents time and the time increases from the left side of the figure to the right side of the figure. Trace 310 represents a torque converter stall speed. Trace 312 represents a torque converter impeller speed. Trace 314 represents a torque converter turbine speed.

The sixth plot from the top of FIG. 3 is a plot of engine rotational speed versus time. The horizontal axis represents time and the time increases from the left side of the figure to the right side of the figure. Trace 316 represents the engine speed.

At time t0, the engine is stopped (not shown) and the maximum propulsive motor torque is at a high level. The propulsive motor torque is low and the electric machine is propelling the vehicle without assistance of the engine. The shaped driver demand torque is low and the torque converter stall speed is at a medium level. The torque converter impeller speed is low and turbine speed is low. The engine rotational speed is zero.

At time t1, engine cranking (rotating the engine via an electric machine or motor) is requested. Engine cranking may be requested via a controller based on vehicle operating conditions, such as driver demand torque increasing or battery state of charge (SOC) decreasing.

The maximum propulsive torque is reduced so that the electric machine may have capacity to rotate the engine. The shaped driver demand begins to increase and the motor torque for engine starting is zero. The torque converter stall speed, torque converter impeller speed, and torque converter turbine speed begin increasing. The engine speed is zero.

At time t2, the maximum propulsive motor torque is reduced to a middle level and the propulsive motor torque is increased to a middle level. The shaped driver demand has increased and it begins to level off. The electric machine or motor torque for engine start begins to increase and torque begins to transfer from the electric machine to the engine via closing the driveline disconnect clutch (not shown). The torque converter stall speed continues to increase as do the torque converter impeller speed and torque converter turbine speed. The engine rotational speed also begins to increase.

Between time t2 and time t3, the maximum propulsive motor torque levels off and it stops decreasing. The propulsive motor torque also levels off and the shaped driver demand torque is constant. The motor torque for engine start increases and then it levels off. The torque converter stall speed, torque converter impeller speed, and torque converter turbine speed increase very little. The engine speed reaches a cranking speed (e.g., 250 revolutions per minute) and it levels off at the engine cranking speed.

At time t3, combustion within the engine causes the engine speed to begin increasing. The motor torque for engine starting begins to be reduced and the maximum propulsive motor torque is increased since additional motor torque is available for propulsion since motor torque for engine starting is being reduced. The shaped driver demand torque continues to increase and the torque converter stall speed continues to increase. The torque converter impeller speed continues to increase and the torque converter turbine speed also continues to increase.

Between time t3 and time t4, the maximum propulsive motor torque increases and then it levels off. The propulsive motor torque also increases and then it also levels off. The motor torque for engine start decreases and then it levels off at a lower level to assist engine run-up. The torque converter stall speed, torque converter impeller speed, and torque converter turbine speed increase very little. The engine rotational speed increases monotonically.

At time t4, the motor torque for engine starting is reduced to zero and the maximum propulsive motor torque increases to a high level. The propulsive motor torque is unchanged and the shaped driver demand torque continues to increase. The engine speed also continues to increase and the torque converter stall speed increases a small amount. The torque converter turbine speed and the torque converter impeller speed approach the torque converter stall speed.

The total motor torque during an engine starting sequence is equal to a sum of the motor torque for engine start 308 and motor torque for vehicle propulsion 304. The maximum motor propulsive torque is used as the target or desired torque to shape the driver demand torque. It may be observed that during an engine crank event, the determination of the maximum propulsion motor torque that is constant is useful for achieving requesting a monotonically increasing propulsion torque (i.e. the shaped driver demand that is monotonically increasing).

The maximum propulsion motor torque may be based on a predicted torque converter impeller speed at an end of engine cranking (e.g., a time when combustion in the engine begins to accelerate the engine above engine cranking speed) according to the following equation:

$$MMPT = \frac{MEPL}{n_{i,crkend}} - MTRS \quad (1)$$

where MMPT is the maximum motor propulsive torque, MEPL is the maximum mechanical power of the electric motor (e.g., maximum battery power minus motor inefficiency power loss), $n_{i,crkend}$ is the estimated torque converter impeller speed at a time when engine cranking ends and engine run-up begins, and MTRS is motor torque that is reserved for engine starting.

FIG. 4 shows how a torque converter impeller speed prediction may be bounded according to engine starting system performance. The vertical lines at times t10-t13 are times of interest in the sequence.

A first plot from the top of FIG. 4 is a plot of driver demand torque versus time. The vertical axis represents driver demand torque and the driver demand torque increases in the direction of the vertical axis arrow. The horizontal axis represents time and time increases from the left side of the plot to the right side of the plot. Trace 402 represents driver demand torque. Trace 404 represents shaped driver demand torque. Shaped driver demand torque is determined from driver demand torque.

The second plot from the top of FIG. 4 is a plot of torque converter impeller speed during an engine start when the torque converter clutch is open. The vertical axis represents torque converter impeller speed and the torque converter impeller speed increases in the direction of the vertical axis arrow. The horizontal axis represents time and time increases from the left side of the plot to the right side of the plot. Trace 406 represents the torque converter impeller speed. At time t10, the driver demand torque and the shaped driver demand torque are low. The torque converter impeller speed is also low. The engine (not shown) is not rotating at this time. The driver demand torque is increased in a step wise manner at time t11. The shaped driver demand increases, but its rate of increase is limited as compared to the driver demand torque. The torque converter impeller speed increases at a rate that is based on the shaped driver demand torque since torque of the electric machine (e.g., 240) is increased to meet the shaped driver demand torque. Note that torque converter impeller speed is equal to the speed of the electric machine because the electric machine is coupled to the torque converter impeller.

An expected engine cranking time (e.g., an amount of time to rotate the engine from zero speed to cranking speed (e.g., 250 RPM)) may be 400 milliseconds. Even if the maximum electric machine torque is applied to crank the engine, the torque converter impeller will not reach the torque converter stall speed (e.g., a speed at which electric machine speed will not increase above when the torque converter turbine is held fixed). Therefore, an estimated torque converter speed may be have an upper bound of the torque converter stall speed and a lower bound of the electric machine speed immediately before the time of the increase in the driver demand torque.

The amount of time between time t11 and time t12 is typically about 400 milliseconds. The amount of time between time t11 and time t13 is typically about 600 milliseconds. The amount of time between time t11 and time t13 may be an amount of time it takes for the torque converter to reach its stall speed.

Referring now to FIG. 5, a plot of a desired estimated torque converter impeller speed at the end of the engine cranking phase is shown. The end of the engine cranking phase occurs and the engine run-up begins when driveline disconnect clutch torque capacity begins to decrease after combustion in the engine is most recently initiated to restart the engine after the engine had most recently stopped rotating.

In plot 500, trace 502 indicates the torque converter stall speed. Trace 504 represents the predicted torque converter impeller speed at the end of the engine cranking phase. Trace 506 represents the torque converter impeller speed. The vertical axis represents speed and the horizontal axis represents time. The vertical lines at times t30-t33 represent times of interest in the sequence.

At time t20, the electric machine is propelling the vehicle without assistance from the engine and the engine is not started. At time t21, an engine start is requested. At time t22, the engine cranking period ends and the engine run-up to engine idle speed or ISG speed begins. The predicted torque converter impeller speed at the end of the engine cranking period may be estimated via the following equation:

$$n_{i,crankend} = k \cdot n_i + (1-k) \cdot n_{i,stall}(n_t, Tq_{ddshaped}) \quad (2)$$

where $n_{i,crankend}$ is the estimated torque converter impeller speed when engine cranking ends and engine run-up begins, k is a weighting factor that is applied to the present torque converter impeller speed $n_i$, $n_{i,stall}$ is the torque converter clutch stall speed. It should be observed that the torque converter stall speed is a function of torque converter turbine speed $n_t$, and of the shaped driver demand torque $Tq_{ddshaped}$. In one example, the weighting factor k may be a function of requested torque converter capacity and estimated torque converter clutch capacity expressed as: k=f(RCC-ECC), where f is a function, RCC is requested torque converter clutch torque capacity, and ECC is estimated torque converter clutch torque capacity. The value of k may go to a value of one as RCC-ECC goes to zero.

FIG. 6 shows a plot that illustrates how an impending end to the engine cranking period may be determined or estimated. The vertical axis of plot 600 represents driveline disconnect clutch torque capacity and the driveline disconnect clutch torque capacity increases in the direction of the vertical axis arrow. The horizontal axis represents time and time increases from the left side of the plot to the right side of the plot. Trace 602 represents a requested driveline disconnect clutch torque capacity during engine cranking. Trace 604 represents an estimated driveline disconnect clutch torque capacity. The vertical lines at times t30-t33 represent times of interest in the sequence.

At time t30, the requested driveline disconnect clutch torque capacity is zero and the estimated driveline disconnect clutch torque capacity is zero since an engine start is not requested and since the engine is stopped (not shown).

At time t31, an engine start is requested (not shown) and the requested driveline disconnect clutch torque capacity is increased. The estimated driveline disconnect clutch torque capacity is zero since it takes time for the driveline to begin transferring torque.

Between time t31 and time t32, the requested driveline disconnect clutch torque is at an elevated level and the estimated driveline disconnect clutch torque begins to incrementally increase before time t32. At time t32, the estimated driveline disconnect clutch torque is equal to the requested driveline disconnect clutch torque. At this time, exiting the engine cranking period is imminent.

At time t33, the engine cranking phase or period is exited and the estimated driveline disconnect clutch torque capacity is equal to the requested driveline disconnect clutch torque capacity. The estimated driveline disconnect clutch torque capacity and the requested driveline disconnect clutch torque capacity are reduced after time t33 when the engine is running up to the speed of the electric machine (not shown). Thus, the end of engine cranking may be estimated to occur when the estimated driveline disconnect clutch torque capacity is equal to the requested driveline disconnect clutch torque capacity.

Referring now to FIG. 7, plots showing how engine starting may be improved by estimating torque converter impeller speed according to the method of FIG. 9 are shown. The system of FIGS. 1 and 2 in cooperation with the method of FIG. 9 may provide the operating sequence of FIG. 7 Vertical lines at times t40-t43 indicate times of interest in the sequence.

The first plot from the top of FIG. 7 includes a vertical axis that represents torque and torque increases in the direction of the vertical axis arrow. The horizontal axis represents time and time increases from the left side of the plot to the right side of the plot. Dash dot trace 704 represents maximum propulsive motor torque according to the prior art. Dashed trace 702 represents maximum propulsive motor torque according to the method of FIG. 9. In this case the maximum motor propulsive torque may be calculated according to equation (1), using the estimated impeller connection speed according to equation (2). Solid trace 706 represents the requested shaped driver demand torque according to the prior art. Small dash trace 708 represents requested shaped driver demand torque according to the method of FIG. 9, which blends the estimated torque converter impeller speed when engine cranking ends and engine run-up begins.

The second plot from the top of FIG. 7 includes a vertical axis that represents rotational speed and rotational speed increases in the direction of the vertical axis arrow. The horizontal axis represents time and time increases from the left side of the plot to the right side of the plot. Dash dot trace 710 represents a predicted torque converter stall speed according to the method of FIG. 9 and governed by equation (2). Dashed trace 712 represents torque converter impeller speed according to the method of FIG. 9, which is based on the predicted torque converter impeller speed when engine cranking ends and engine run-up begins. Solid trace 714 represents the torque converter current impeller speed as reported by a speed sensor.

At time t40, the maximum propulsive motor torque is at a high level as is the maximum propulsive motor torque according to the method of FIG. 9. The shaped driver demand torque and the shaped driver demand torque according to the method of FIG. 9 are low. The predicted torque converter stall speed according to the method of FIG. 9 is at a middle level. The current torque converter impeller speed is at a low speed.

At time t41, an engine start is requested. The maximum propulsion motor torque and the maximum propulsion motor torque according to the method of FIG. 9 are reduced. The shaped driver demand torque and the shaped driver demand torque according to the method of FIG. 9 begin to increase. The predicted torque converter speed, torque converter impeller speed, and torque converter impeller speed according to the method of FIG. 9 begin increasing.

Between time t41 and time t42, the maximum propulsion motor torque is reduced more than the maximum propulsion motor torque according to the method of FIG. 9. The shaped driver demand torque increases to a time near time t42, but shortly before time t42 the shaped driver demand torque levels off and it ceases increasing. The shaped driver demand torque according to the method of FIG. 9 increases steadily from time t41 to time t42. The predicted torque converter stall speed increases from time t41 to time t42. The torque converter impeller speed according to the method of FIG. 9 increases steadily and then it levels off near time t42. The torque converter current speed continuously increases from time t41 to time t42. Because the maximum propulsive motor torque according to the method of FIG. 9 decreases during engine cranking, the driveline may exhibit non-monotonic (e.g., may exhibit a decrease or leveling off instead of continuously increasing) driver demand torque response during engine cranking. In other words, even with improvements, one embodiment of the method of FIG. 9 may not provide monotonic (e.g., continuous increasing values without leveling off or decreasing) driver demand torque, which may result in driveline torque disturbances.

At time t42, the engine cranking period ends and the engine run-up period begins. Time t42 is the terminal point for the prediction algorithm according to the method in FIG. 9.

At time t43, the engine speed is equal to the speed of the electric machine (e.g., 240) and the driveline disconnect clutch is locked closed so that the engine may transmit torque to the driveline. The maximum propulsion motor torque returns to a high level and the shaped driver demand torque request continues increasing. The torque converter speed and the torque converter stall speed are equal.

Thus, FIG. 7 shows that the method of FIG. 9 may provide a higher or greater value for the maximum propulsive motor torque than the prior art method so that driveline torque may monotonically increase during engine starting so that a torque hole or deficiency may be less noticeable to vehicle occupants. Consequently, vehicle drivability may be improved.

Referring now to FIG. 8, plots showing how engine starting may be improved by estimating torque converter impeller speed according to a second method of FIG. 9 are shown. The system of FIGS. 1 and 2 in cooperation with the method of FIG. 9 may provide the operating sequence of FIG. 8 Vertical lines at times t50-t53 indicate times of interest in the sequence.

The first plot from the top of FIG. 8 includes a vertical axis that represents torque and torque increases in the direction of the vertical axis arrow. The horizontal axis represents time and time increases from the left side of the plot to the right side of the plot. Dash dot trace 804 represents maximum propulsive motor torque according to the prior art. Dashed trace 802 represents maximum propulsive motor torque according to the method of FIG. 9, which applies an estimate of torque converter stall speed that is based on unshaped driver demand torque. Solid trace 806 represents the requested shaped driver demand torque according to the prior art. Small dash trace 808 represents requested shaped driver demand torque according to the method of FIG. 9, which applies an estimate of torque converter stall speed that is based on unshaped driver demand torque.

The second plot from the top of FIG. 8 includes a vertical axis that represents rotational speed and rotational speed increases in the direction of the vertical axis arrow. The horizontal axis represents time and time increases from the left side of the plot to the right side of the plot. Dash dot trace 810 represents a predicted torque converter stall speed according to the method of FIG. 9. Dashed trace 812 represents predicted torque converter impeller connection speed according to the method of FIG. 9 and it is governed by equation (3). It may be observed that the predicted impeller connection speed rapidly increases from the initial estimate since the unshaped driver demand torque contributes to its determination. Solid trace 814 represents the torque converter impeller speed.

At time t50, the maximum propulsive motor torque is at a high level as is the maximum propulsive motor torque according to the method of FIG. 9. The shaped driver demand torque and the shaped driver demand torque according to the method of FIG. 9 are low. The predicted torque converter stall speed according to the method of FIG. 9 is at a middle level. The torque converter current impeller speed is at a low speed.

At time t51, an engine start is requested. The maximum propulsion motor torque and the maximum propulsion motor torque according to the method of FIG. 9 are reduced. The shaped driver demand torque and the shaped driver demand torque according to the method of FIG. 9 begin to increase. The predicted torque converter impeller speed, the predicted torque converter impeller stall speed, and torque converter impeller connection speed according to the method of FIG. 9 begin increasing.

Between time t51 and time t52, the maximum propulsion motor torque according to the method of FIG. 9 is reduced in an almost step-wise fashion near t51 and then it levels off. The shaped driver demand torque increases to a time near time t52, but shortly before time t52, the shaped driver demand torque levels off and it ceases increasing. The shaped driver demand torque according to the method of FIG. 9 increases steadily from time t51 to time t52. The predicted torque converter stall speed increases from time t51 to time t52. The predicted torque converter impeller connection speed according to the method of FIG. 9 increases in a nearly step-wise manner and then it levels off near time t51. The torque converter current impeller speed continuously increases from time t51 to time t52. Because the maximum propulsive motor torque according to the method of FIG. 9 does not decrease during engine cranking, the driveline may exhibit monotonic (e.g., exhibits no decrease or leveling off) driver demand torque response during engine cranking.

At time t52, the engine cranking period ends and the engine run-up period begins. At time t53, the engine speed is equal to the speed of the electric machine (e.g., 240) and the driveline disconnect clutch is locked closed so that the engine may transmit torque to the driveline. The maximum propulsion motor torque returns to a high level and the shaped driver demand torque request continues increasing. The torque converter speed and the torque converter stall speed are equal.

Thus, FIG. 8 shows that the method of FIG. 9 may provide a higher or greater value for the maximum propulsive motor torque than the prior art method so that driveline torque may monotonically increase during engine starting so that a torque hole or deficiency may be less noticeable to vehicle occupants. Consequently, vehicle drivability may be improved.

Turning now to FIG. 9, a flowchart of a method for operating a driveline is shown. In particular, the method of FIG. 9 may be applied to start an engine that has been stopped (e.g., not rotating and combusting fuel). The method of FIG. 9 may be incorporated into and may cooperate with the system of FIGS. 1-2. Further, at least portions of the method of FIG. 9 may be incorporated as executable instructions stored in non-transitory memory while other portions of the method may be performed via a controller transforming operating states of devices and actuators in the physical world.

At 902, method 900 determines vehicle operating conditions. Vehicle operating conditions may be determined from the vehicle's various sensors and actuators. The vehicle operating conditions may include, but are not limited to engine speed, vehicle speed, driver demand torque, BISG temperature, and torque converter clutch operating state. Method 900 proceeds to 904.

At 904, method 900 judges if the driveline's torque converter clutch is open and if the engine is being cranked in response to an engine start request. The engine may be cranked by at least partially closing the driveline disconnect clutch and transferring torque from an electric machine (e.g., 240) to the engine. Method 900 may judge if the torque converter clutch is open based on an output state of a controller, or alternatively, based on a positon of a torque converter clutch actuator. If method 900 judges that the torque converter clutch is open and the engine is being cranked, the answer is yes and method 900 proceeds to 906. Otherwise, the answer is no and method 900 proceeds to 950.

At 950, method 900 delivers the requested driver demand torque via the engine and/or the electric machine. Method 900 may determine the requested driver demand torque via a position of a driver demand pedal and vehicle speed. The requested driver demand torque may then be provided solely via the engine, solely via the electric machine, or by the engine and the electric machine. For example, at low driver demands, the electric machine may supply all of the driver demand. At middle level driver demands, the engine may supply the driver demand. At high driver demand levels, the engine and the electric machine may provide the driver demand. Method 900 proceeds to exit after the driver demand is provided.

At 906, method 900 determines the stall speed for the driveline torque converter. In one example, method 900 may look up a stall speed of the torque converter from a memory location in the controller. The stall speed may be a function of the design of internal components within the torque converter (e.g., the distance between the impeller and the turbine), torque converter turbine speed, and driver demand torque. Method 900 proceeds to 908 after looking up the torque converter stall speed.

At 908, method 900 predicts a torque converter impeller speed at an end of an engine cranking period (e.g., when the engine begins combusting air and fuel). In one example, method 900 predicts the torque converter impeller speed at the engine of engine cranking via previously mentioned equation 2. In another example, method 900 predicts the torque converter impeller speed at the end of the engine cranking period via the following equation:

$$n_{i,crankend} = k \cdot n_i + (1-k) \cdot [n_{i,stall}(n_p k_{Tq} Tq_{DD,shaped} + (1-k_{Tq}) Tq_{DD,unshaped})] \quad (3)$$

where $k_{Tq}$ is a weighting factor that is applied to the shaped driver demand torque $Tq_{DD,shaped}$, where $Tq_{DD,unshaped}$ is the unshaped driver demand torque or the driver demand torque that is not slew rate limited, and where $k$, $n_i$, $n_{i,stall}$, $n_t$ are as previously described. The torque converter stall speed is a function of $n_t$, $k_{Tq}$, $Tq_{DD,shaped}$, and $Tq_{DD,unshaped}$. Equation 3 may affect the maximum propulsive motor torque as shown in FIG. 8. Method 900 proceeds to 910.

At 910, method 900 determines the motor and battery power limits. In one example, the motor power limits may be determined via looking up values that are stored in a table or function in controller memory. The motor and battery power limits may be a function of motor temperature, battery temperature, ambient temperature, and state of charge. Method 900 proceeds to 912.

At 912, method 900 determines the maximum propulsive motor torque via equation 1. The amount of motor torque that is reserved for starting the engine may be a function of engine starting urgency level, vehicle drive mode, and the selected engine starting device (e.g., ISG, starter, etc.). The amount of motor torque that is reserved for starting the engine may be stored in a function or table in controller memory that may be indexed or referenced via the starting urgency level, vehicle drive mode, and the selected engine starting device. The motor limits may also be stored in controller memory and they may be retrieved or referenced by motor temperature, motor speed, other motor operating parameters. The battery limits may be stored in controller memory and they may be retrieved or referenced by battery temperature, battery internal resistance, and other battery operating parameters. The engine starting urgency may be a function of a rate of change of position of the driver demand pedal. Method 900 proceeds to 914.

At 914, method 900 limits the driver demand torque request to the maximum propulsive motor torque during engine cranking. The engine is rotated via an electric machine during engine cranking. For example, if the driver demand torque request is 100 Newton-meters and the maximum propulsive motor torque during engine cranking is 75 Newton-meters, the driver demand torque may not exceed 75 Newton-meters while the engine is being cranked via an electric machine (e.g., 240 of FIG. 2). By limiting the maximum propulsive motor torque, there may be sufficient motor torque for propelling the vehicle and starting the engine. Method 900 also delivers the requested and limited driver demand torque and cranks the engine via the electric machine (e.g., 240) so that the vehicle may be propelled while the engine is being started. Method 900 at least partially closes the driveline disconnect clutch to crank the engine. Method 900 proceeds to 916.

At 916, method 900 judges if the driveline's torque converter clutch is open and if the engine is being cranked in response to an engine start request. If method 900 judges that the torque converter clutch is open and the engine is being cranked, the answer is yes and method 900 returns to 906. Otherwise, the answer is no and method 900 proceeds to exit.

In this way, torque of a driveline may be allocated and managed so that the possibility of a torque hole or disturbance in driveline torque may be avoided or reduced during engine cranking. The method that is described herein predicts torque converter impeller speed at an engine of an engine cranking period so that the maximum motor propulsive torque estimate may be improved.

Thus, the method of FIG. 9 provides for a method for starting an engine, comprising: cranking the engine via an electric machine and limiting propulsive torque generated by the electric machine via a controller according to a predicted torque converter impeller speed. The method further comprises limiting a driver demand torque request according to the maximum motor propulsive torque and adjusting torque of the electric machine according to the driver demand torque request. The method further comprises estimating a maximum motor propulsive torque according to a predicted torque converter impeller speed, where the maximum motor propulsive torque is based on a motor torque reserved for engine starting. The method includes where the motor torque reserved for engine starting is a function of a vehicle drive mode. The method includes where the motor torque reserved for engine starting is also a function of engine starting urgency. The method includes where the engine starting urgency is based on a rate of change of a driver demand pedal. The method includes where the maximum motor propulsive torque is also based on a maximum mechanical power of the electric motor.

The method of FIG. 9 also provides for a method for operating an engine, comprising: generating an estimate of a speed that a torque converter impeller will be at an end of an engine cranking period; and adjusting a torque of an electric machine according to the estimate of the speed that the torque converter impeller will be at the end of the engine cranking period. The method includes where adjusting the torque includes adjusting the torque during engine cranking. The method includes where the estimate of the speed that the torque converter impeller will be at the end of the engine cranking period is based on a first weighting factor and a second weighting factor. The method includes where the first weighting factor is applied to a present torque converter impeller speed. The method includes where the second weighting factor is applied to a shaped driver demand torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for starting an engine, comprising:
cranking the engine via an electric machine and limiting propulsive torque generated by the electric machine via a controller according to a predicted torque converter impeller speed, where the predicted torque converter impeller speed is based on a torque converter impeller speed and a torque converter stall speed.

2. The method of claim 1, further comprising limiting a driver demand torque request according to the maximum motor propulsive torque and adjusting torque of the electric machine according to the driver demand torque request.

3. The method of claim 2, further comprising estimating a maximum motor propulsive torque according to a predicted torque converter impeller speed, where the maximum motor propulsive torque is based on a motor torque reserved for engine starting.

4. The method of claim 3, where the motor torque reserved for engine starting is a function of a vehicle drive mode.

5. The method of claim 4, where the motor torque reserved for engine starting is also a function of engine starting urgency.

6. The method of claim 5, where the engine starting urgency is based on a rate of change of a driver demand pedal.

7. The method of claim 2, where the maximum motor propulsive torque is also based on a maximum mechanical power of the electric motor.

8. A system, comprising:
an engine;
a transmission;
an electric machine coupled to a torque converter, the torque converter positioned in a driveline between the transmission and a driveline disconnect clutch, where the driveline disconnect clutch is positioned in the driveline between the engine and the electric machine; and
a controller including executable instructions stored in non-transitory memory that cause the controller to estimate a maximum motor propulsive torque for the electric machine, the maximum motor propulsive torque based on a maximum mechanical power of the electric motor, a predicted torque converter impeller speed, and a motor torque reserved for starting the engine; and
additional instructions to crank the engine via the electric machine, at least partially close the driveline disconnect clutch to crank the engine, and determine the predicted torque converter impeller speed based on a torque converter impeller speed and a torque converter stall speed.

9. The system of claim 8, where the torque converter stall speed is based on a shaped driver demand torque.

10. The system of claim 9, where the torque converter stall speed is based further on a torque converter turbine speed.

11. The system of claim 10, where the torque converter stall speed is further based on an unshaped driver demand torque.

12. A method for operating an engine, comprising:
generating an estimate of a speed that a torque converter impeller will be at an end of an engine cranking period, where the estimate of the speed that the torque converter impeller will be at the end of the engine cranking period is based on a first weighting factor and a second weighting factor; and
adjusting a torque of an electric machine according to the estimate of the speed that the torque converter impeller will be at the end of the engine cranking period.

13. The method of claim 12, where adjusting the torque includes adjusting the torque during engine cranking.

14. The method of claim 12, where the first weighting factor is applied to a present torque converter impeller speed.

15. The method of claim 14, where the second weighting factor is applied to a shaped driver demand torque.

* * * * *